United States Patent
Asbill

(10) Patent No.: US 7,289,111 B2
(45) Date of Patent: Oct. 30, 2007

(54) RESISTIVE TOUCH PAD WITH MULTIPLE REGIONS OF SENSITIVITY

(75) Inventor: Roger Lee Asbill, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 652 days.

(21) Appl. No.: 10/809,246

(22) Filed: Mar. 25, 2004

(65) Prior Publication Data

US 2005/0212773 A1   Sep. 29, 2005

(51) Int. Cl.
G06F 3/045 (2006.01)
G06F 3/041 (2006.01)
G06F 3/044 (2006.01)

(52) U.S. Cl. ............... 345/174; 345/173; 345/178; 178/18.01; 178/18.03; 178/18.05; 178/18.06; 178/18.07

(58) Field of Classification Search ............ 345/173, 345/174, 178; 178/18.01, 18.03, 18.05, 18.06, 178/18.07
See application file for complete search history.

(56) References Cited

U.S. PATENT DOCUMENTS 3,911,215 A * 10/1975 Hurst et al. ............ 178/18.05
5,815,141 A * 9/1998 Phares .................... 345/173
6,459,424 B1   10/2002 Resman
7,019,734 B2 * 3/2006 Cross et al. ............ 345/173
2004/0090431 A1 * 5/2004 Kong et al. ............. 345/173

FOREIGN PATENT DOCUMENTS

JP   08-138486   5/1996

* cited by examiner

*Primary Examiner*—Richard Hjerpe
*Assistant Examiner*—My-Chau T. Tran
(74) *Attorney, Agent, or Firm*—Duke W. Yee; Jason O. Piche; Theodore D. Fay, III

(57) ABSTRACT

A touch pad for a data processing system includes a first film and an electrically conductive first thin film above the first film, a plurality of electrically non-conductive spacer dots above the first thin film, a second electrically conductive thin film above the plurality of spacer dots, and a second film above the second thin film. The density of spacer dots above the first thin film is non-uniform. In one implementation, the first film is a ceramic, the second film is a flexible polymer, and the first and second thin films are a metal-oxide compound. In one embodiment, the spacer dot density is in a first range over a first portion of the first film and in a second range over a second portion of the first film. The second portion of the first film may define a signature box suitable for receiving a user's signature.

14 Claims, 3 Drawing Sheets

RESISTIVE TOUCH PAD WITH MULTIPLE REGIONS OF SENSITIVITY

BACKGROUND

1. Field of the Present Invention

The present invention is in the field of data processing systems and, more particularly, data processing systems that employ resistive touch pads as an input device.

2. History of Related Art

Data processing systems frequently employ touch pads as a means of enabling user input to the system. Touch pads are widely implemented for at least two different applications. In notebook computer applications, touch pads often serve the function of a traditional pointing device such as a computer mouse. In point-of-sale (POS) applications, touch pads are used to facilitate retail transactions by providing a non-paper method for receiving signatures.

In both notebook computer applications and POS applications, designing an optimal touch pad involves a tradeoff between competing considerations. Ideally, touch pads should readily recognize user input while, at the same time, touch pads should be robust enough to reject unintended or incidental inputs, frequently referred to as "palm events" caused when the user, or an article associated with the user, makes unintended contact with the touch pad. Palm events can occur when the user's palm, finger, jewelry, etc., contact the touch pad.

Touch pads are typically designed to balance these competing considerations by targeting the minimum force required for sensors in the touch pad to recognize a particular touch as an intended input. The higher this minimum force is, the more robust the touch pad is to accidental touches, but the less sensitive the touch pad is to intended touches. Conversely, if the minimum force is too low, the touch pad will be quite sensitive to intended touches, but may not be able to adequately reject unintended touches. It would be desirable to implement a touch pad that was, simultaneously, highly sensitive to intended input, and highly robust against palm events and other unintended input.

SUMMARY OF THE INVENTION

The objective identified above is addressed by a resistive touch pad according to the present invention. The touch pad of the present invention is designed and manufactured to include two or more sensitivity areas, with at least one sensitivity area being characterized as more sensitive and at least one sensitivity area being characterized as more robust. The robust area(s) may be designed by using a higher density of insulating spacer material (frequently referred to within the industry as "spacer dots" or simply "dots") while the sensitive areas(s) may include a less dense configuration of dots.

In an implementation suitable for a POS application, the sensitive area may comprise a portion of the touch pad designated for receiving a customer's signature and/or other inputs. In a notebook application in which the user's palms are likely to be in close proximity to the touch pad during normal operation, the robust areas may include a border region around the perimeter of the sensitive areas. In either of these configurations, or in other configurations, the use of two or more regions of sensitivity provides a touch pad that is optimized in terms of sensitivity and robustness.

BRIEF DESCRIPTION OF THE DRAWINGS

Other objects and advantages of the invention will become apparent upon reading the following detailed description and upon reference to the accompanying drawings in which.

Figure 1:
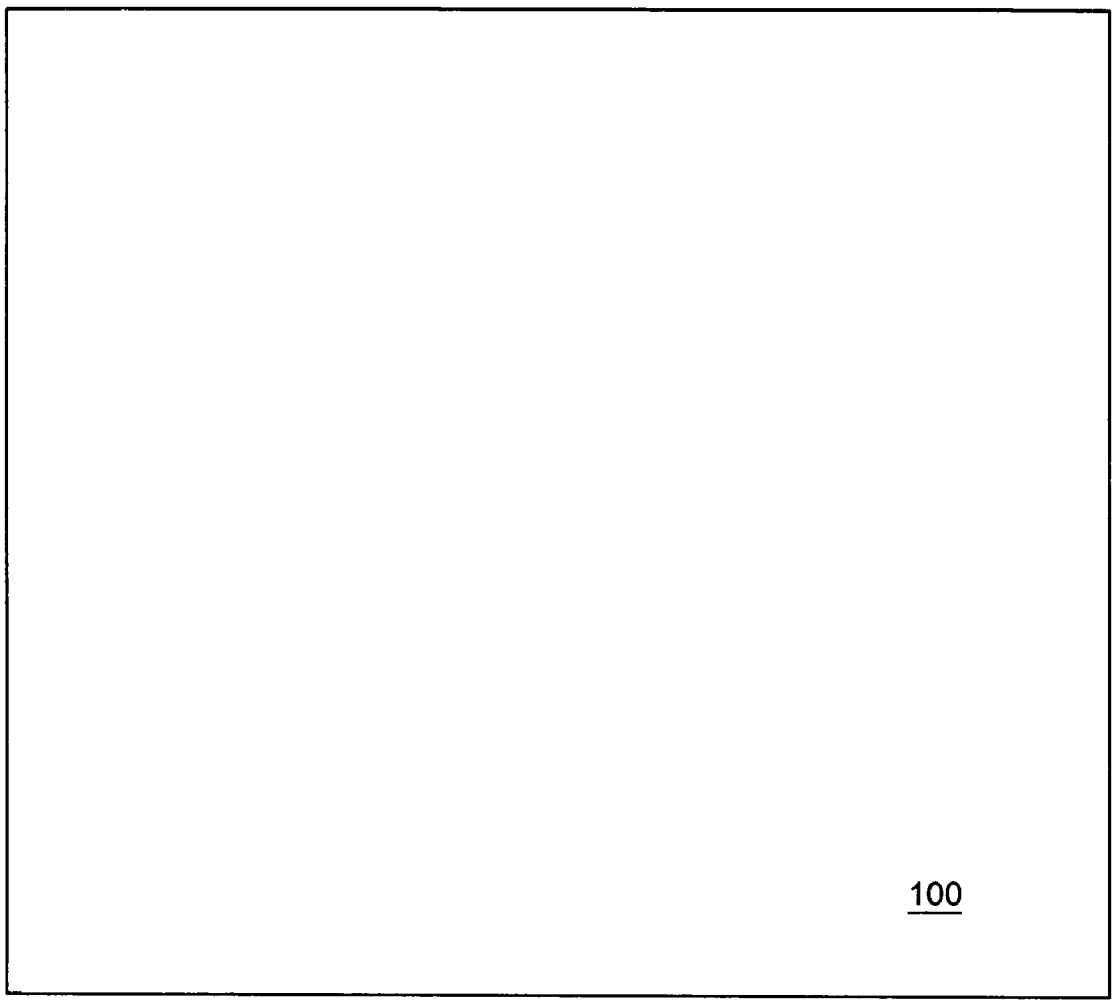
FIG. 1 is a top view of a data processing system touch pad.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention is concerned with a resistive touch pad for a data processing system. For purposes of this invention, a touch pad refers to substantially any form of resistive touch sensors. The touch pads of the present invention include a first region or area having a relatively high sensitivity and a region of relatively low sensitivity. The regions may be differentiated by manufacturing the touch pad with a less dense dot arrangement in the more sensitive region and a more dense dot arrangement in the less sensitive area. The dot density is varied between or among the different sensitivity regions by varying the dot pitch, dot diameter, or a combination of both. The more sensitive area may be restricted to a substantially rectangular "signature" block in a lower region of the touch pad in an application such as a POS application. In a notebook computer application, the low sensitivity regions may define a perimeter or border around the more sensitive center portion of the touch pad.

Figure 2:
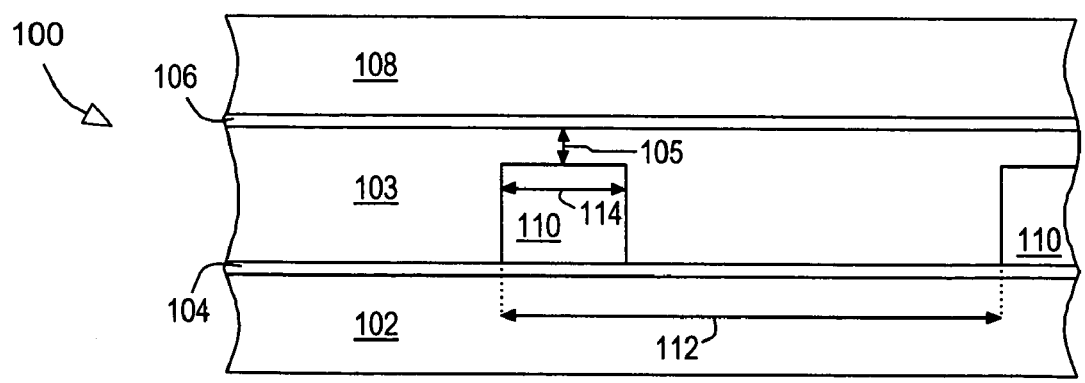
FIG. 2 is a partial cross sectional view of the touch pad of FIG. 1.

Referring now to FIG. 1 and FIG. 2, selected features of a resistive touch pad 100 (also referred to herein simply as touch pad 100) are depicted from a top view (FIG. 1) and a partial cross sectional view (FIG. 2). Touch pad 100 as depicted in FIG. 1 is a substantially rectangular touch pad suitable for receiving input and transmitting the input to a data processing system. Specifically, touch pad 100 is configured to recognize when the touch pad is depressed with a minimum force and to determine the location within the touch pad where the touching occurred.

Referring to the cross sectional view of FIG. 2, resistive touch pad 100 includes a first surface 102 and a flexible film 108 positioned above it such that the two are separated by an air or vacuum gap 103. Surface 102 and film 108 are shown as being coated or covered by electrically conductive and relatively thin films 104 and 106 respectively. Within the gap 103 between thin films 104 and 106, a plurality of spacer dots 110 are shown as being located on first thin film 104. Spacer dots 110 extend from first thin film 104 towards second thin film 106. In the depicted embodiment, the dimension of the gap between thin films 104 and 106 is greater than the height of spacer dots 110 such that a small gap 105 exists between the top of each spacer 110 and second thin film 106 when no external pressure is applied to first film 108 (i.e., when first film 108 is "flat").

In one embodiment of the invention, the second touch pad film 108 is made of a flexible acrylic or PET polymer while surface 102 may be a rigid or semi-rigid plate such as a ceramic or glass plate. In other embodiments, surface 102 may comprise the same materials as touch pad film 108. First and second thin films 104 and 106 form electrically conductive surfaces of their respective films. In one embodiment, conductive films 104 and 106 are each comprised of a conductive metal-oxide compound such as Itrium Tin Oxide. Spacer dots 110 may be substantially circular, square or rectangular in cross section. Spacer dots 110 are likely comprised of an electrically insulating material such that dots do not conduct electricity.

Although FIG. 1 is not shown to scale, certain dimensions of the configuration are described for the sake of completeness. A characteristic of touch pad 100 that is significant in terms of its affect on the touch pad's sensitivity is the density of spacer dots 110. For purposes of this disclosure, the spacer dot density is the ratio of the diameter 114 of spacer dots 110 to the dot-to-dot pitch represented by reference numeral 112. The dot diameter is likely in the range of approximately 50 to 90 micrometers while spacer dot pitch 112 is likely in the vicinity of 1.3 to 1.7 millimeters. Increasing the spacer dot density such as by increasing the spacer dot diameter 114 and/or decreasing the spacer dot pitch 112 results in a decrease in touch pad sensitivity. Conversely, decreasing the spacer dot density by decreasing the spacer dot diameter 114 and/or increasing the spacer dot pitch 112 produces an increase in the touch pad sensitivity. As described above, higher touch pad sensitivity results in a lower threshold for recognizing a touch, but undesirably increases the number of palm events that are recognized as a touch while lower touch pad sensitivity results in a touch pad that is more robust against palm events, but requires greater exerted force to recognize an intended touch. In a conventional touch pad application, the spacer dot density is uniform or constant across the entire touch pad. In this configuration, the touch pad sensitivity is likewise uniform across the film. The touch pad according to the present, however, achieves varied regions of sensitivity by implementing a touch pad that includes multiple regions of sensitivity.

Figure 3:
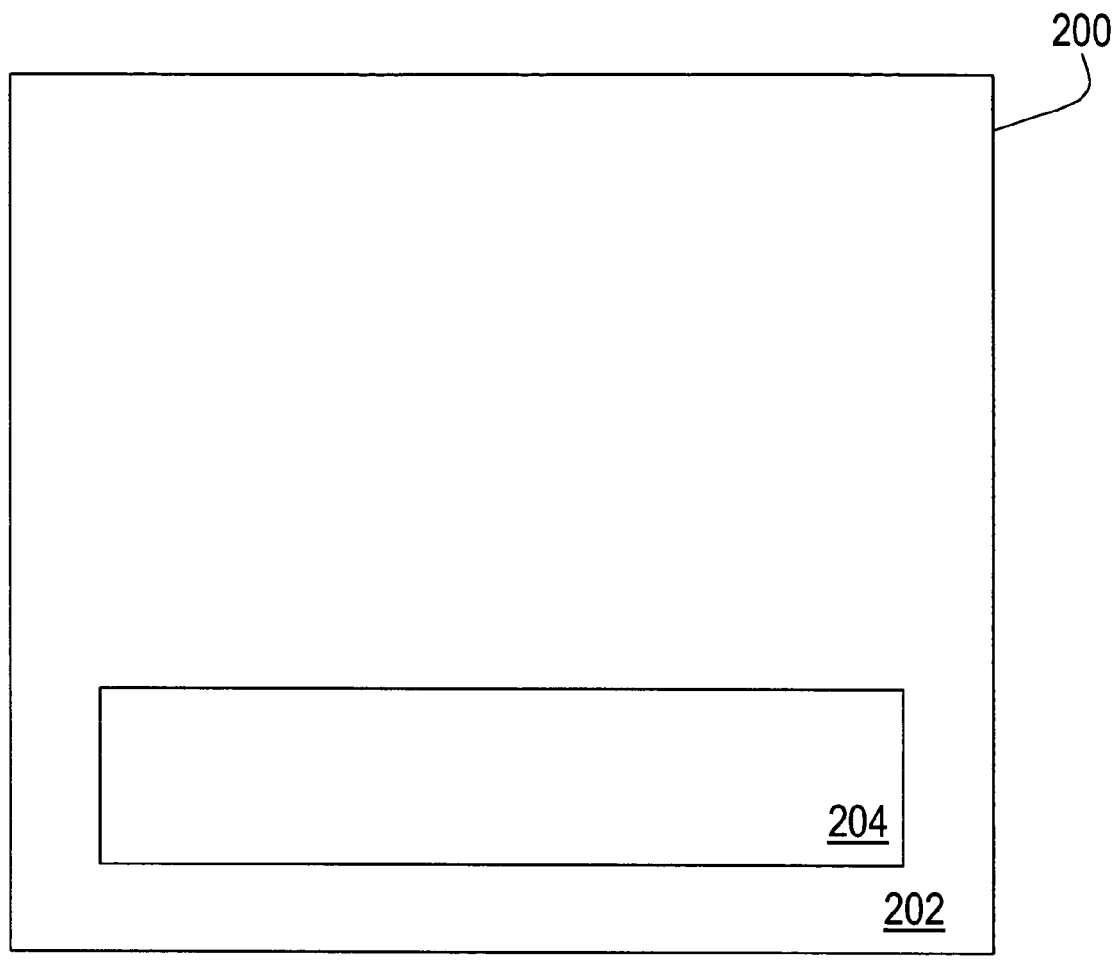
FIG. 3 is a data processing system touch pad according to one embodiment of the present invention.
Figure 4:
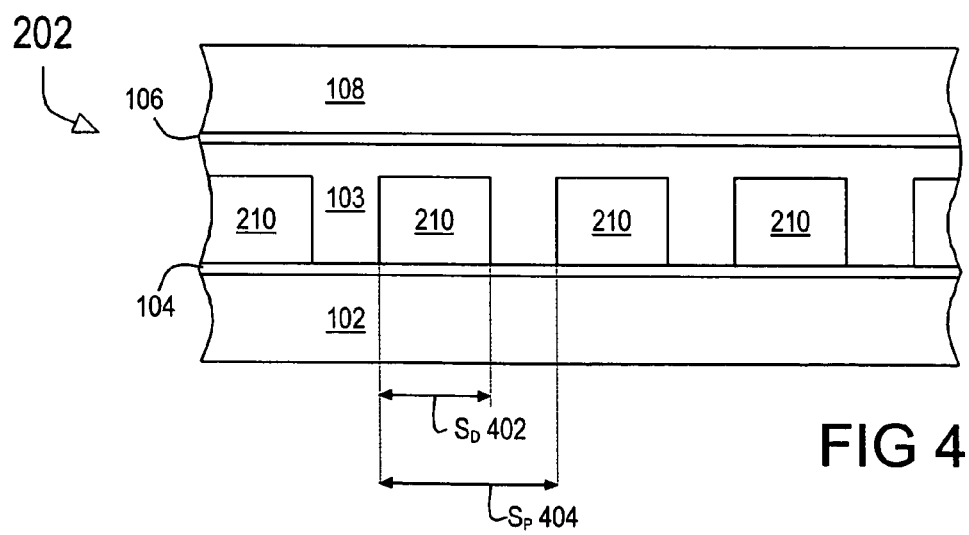
FIG. 4 is a partial cross sectional view of a first part of the touch pad of FIG. 3.
Figure 5:
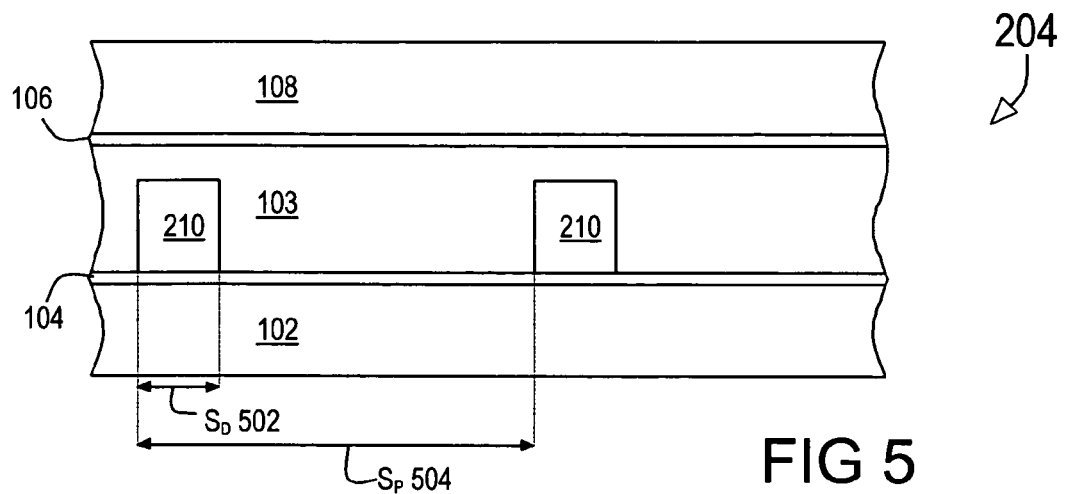
FIG. 5 is a partial cross sectional view of a second part of the touch pad of FIG. 3.

Referring now to FIG. 3, FIG. 4, and FIG. 5 a touch pad 200 according to one embodiment of the present invention is depicted. Touch pad 200 includes a first region 202 and a second region 204. In the depicted embodiment, second region 204 defines a substantially rectangular area that occupies a low portion of the first region 202. In the preferred embodiment, first and second regions 202 and 204 are characterized as having different sensitivities. More specifically for the embodiment depicted in FIG. 3, first region 202 is characterized by a relatively low sensitivity while second regions 204 is characterized by a relatively high sensitivity. This embodiment of the invention is highly useful in a POS application where touch pad 200 functions as a paperless device for accepting the signature of a customer in a retail setting. By confining the high sensitivity area to the region where a customer places his or her signature, the depicted embodiment facilitates the retail transaction by making it easier for the customer's "handwriting" to be recognized as an intended input while reducing the likelihood that touching events occurring exterior to region 204 are recognized as intended input. By implementing region 202 exterior to region 204 as a low sensitivity region, touch pad 200 reduces the probability of inadvertent touchings without entirely preventing this portion of touch pad 200 from being used as an input device. Specifically, there may be applications that benefit from enabling low sensitivity region 202, as well as high sensitivity region 204, to receive user input-albeit with a different degree of sensitivity. In a POS application, for example, it may be desirable to use high sensitivity region 204 for entering a signature or the like, where low sensitivity is desirable while, at the same time, enabling the user to enter other forms of input via low sensitivity region 202 (or a portion thereof). Users, for example, might use a stylus to execute their signatures in high sensitivity region 204 and then use the stylus to indicate conclusion or acceptance of the transaction by pressing a designated location within low sensitivity region 202. In this application, low sensitivity may be sufficient for the limited purpose of enabling the user to "click" an "OK" button or perform a suitable event.

Referring to FIG. 4 and FIG. 5, two partial cross sectional views of touch pad 200 of FIG. 3 are shown. FIG. 4 is a view from within low sensitivity region 202 (FIG. 3) of touch pad 200 while FIG. 5 is a view from within high sensitivity region 204. In the depicted implementations, it is apparent that the space dot density shown in FIG. 4 (the low sensitivity region) is greater than the spacer dot density shown in FIG. 5. In one implementation, for example, the density of spacer dots 210 in the low sensitivity region 202 (FIG. 4), expressed as the ratio of the spacer dot diameter $S_D$ 402 to the space dot pitch $S_P$ 404 is in the range of approximately 0.08 to 0.14 whereas the spacer dot density in high sensitivity region 204, expressed as the ratio of the spacer dot density $S_D$ 502 to the spacer dot pitch $S_P$ 504 (FIG. 5) is in the range of approximately 0.01 to 0.05.

Implementing a touch pad 200 having different spacer dot densities may slightly increase the complexity of the touch pad manufacturing process. The dot size and pitch are created by a screening process using a fiber mesh or thin laser cut metal screen with holes for the dot pattern. These holes allow the dot material to flow when force is applied via a squeegee. Once the screen is in use, the dot density is not a significant factor in terms of manufacturing, except that high densities may require a little finer adjustment in set-up. Conventional touch pads having uniform spacer dot densities can be fabricated in large sheets that can then be cut in any configuration. Implementing touch pads having different spacer dot density portions as described herein involves specific placement of the high sensitivity and low sensitivity areas that dictates the manner in which the touch pad is subsequently formed. While it is generally disadvantageous to increase the complexity of a manufacturing process, the resulting touch pad in this case achieves a desired differentiation in spacer dot density and touch pad sensitivity that is independent of any operating system and/or software controls.

Figure 6:
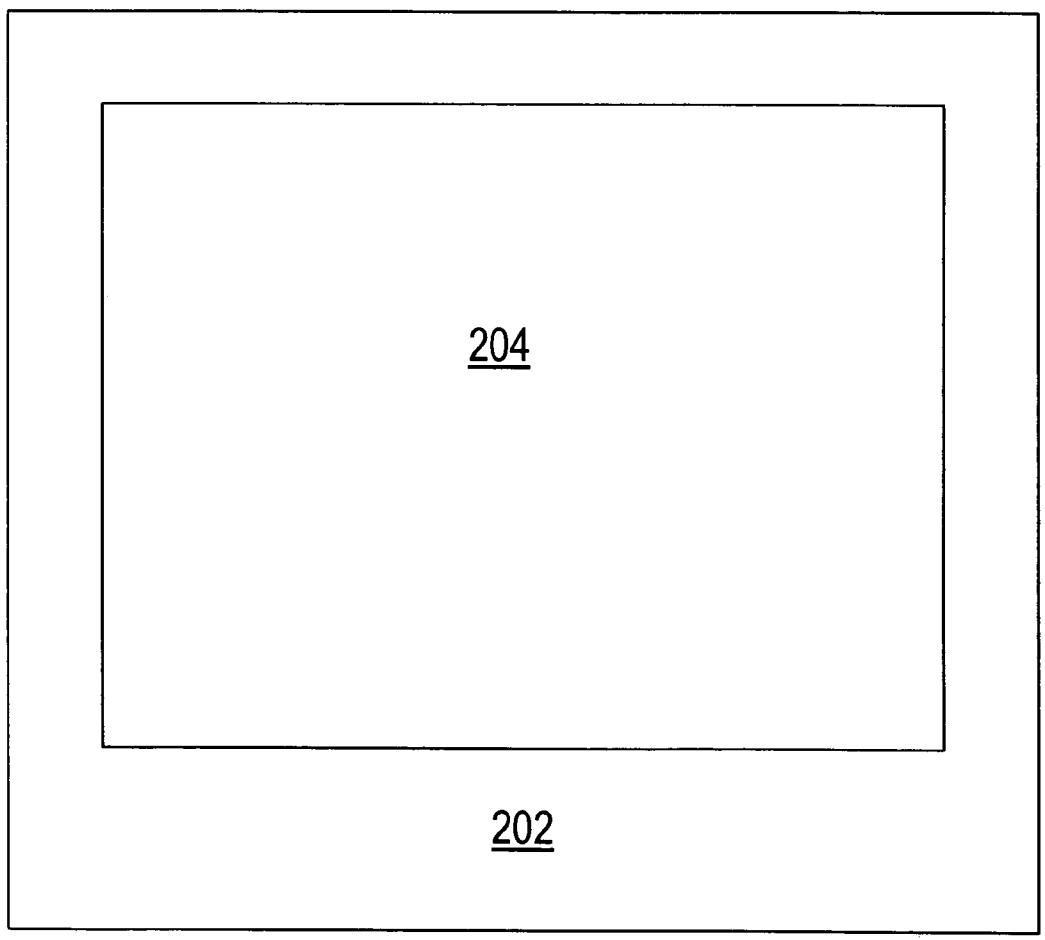
FIG. 6 is a top view of an alternative embodiment of a data processing system of FIG. 3.

Referring now to FIG. 6, an implementation of touch pad 200 is shown as including a low sensitivity region 202 that formers a border around high sensitivity region 204. This embodiment may be desirable in a notebook computer application of resistive touch pad 200 where it is desirable to have a low threshold for user input in the center of touch pad 200 while preventing palm events at the perimeter of touch pad 200 (without entirely prohibiting user input at the perimeter). Because notebook computer users frequently operate with both hands in close proximity to touch pad 200, palm events at the perimeter of touch pad 200 are not uncommon. The configuration of FIG. 6 beneficially reduces the probability of palm events from occurring while permitting the user to enter intended input at the center of touch pad 200 easily.

It will be apparent to those skilled in the art having the benefit of this disclosure that the present invention contemplates a mechanism for providing a data processing system touch pad having different areas of sensitivity. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A touch pad for a data processing system, comprising:
a first surface and a first electrically conductive thin film above the first surface;
a plurality of electrically non-conductive spacer dots above the first electrically conductive thin film;
a second electrically conductive thin film above the plurality of spacer dots;
a second film above the second electrically conductive thin film;
wherein a density of spacer dots above the first electrically conductive thin film is non-uniform, and wherein a spacer dot density is in a range of 0.08 to 0.14 over a first portion of the first electrically conductive thin film.

2. The touch pad of claim 1, wherein the first surface is a ceramic, the second film is a flexible polymer, and the first and second electrically conductive thin films are a metal-oxide compound.

3. The touch pad of claim 1, wherein a spacer dot density is in a range of 0.01 to 0.05 over a second portion of the first electrically conductive thin film.

4. The touch pad of claim 3, wherein the second portion of the first electrically conductive thin film comprises a signature box suitable for receiving a user's signature.

5. The touch pad of claim 3, wherein the first portion of the first electrically conductive thin film comprises a perimeter surrounding the second portion of the first electrically conductive thin film.

6. The touch pad of claim 3, wherein a spacer dot diameter in the first portion equals a spacer dot diameter in the second portion and wherein a spacer dot pitch in the first portion differs from a spacer dot pitch in the second portion.

7. A touch pad for a data processing system, comprising:
a first touch pad portion having a first sensitivity determined at least in part by a configuration of a first set of spacer dots within the first touch pad portion; and
a second touch pad portion having a second sensitivity determined at least in part by a configuration of a second set of spacer dots within the second touch pad portion;
wherein the first sensitivity and the second sensitivity differ due to differences in the configuration of the first set of spacer dots and the configuration of the second set of spacer dots, and wherein a spacer dot density in the first touch pad portion exceeds a spacer dot density in the second touch pad portion by a factor in a range of 1.6 to 14.

8. The touch pad of claim 7, wherein the first touch pad portion of the touch pad comprises a perimeter portion of the touch pad.

9. The touch pad of claim 7, wherein the spacer dot density in the first touch pad portion is in a range of approximately 0.08 to 0.14.

10. A touch pad for a data processing system, comprising:
a first touch pad portion having a first sensitivity determined at least in part by a configuration of a first set of spacer dots within the first touch pad portion; and
a second touch pad portion having a second sensitivity determined at least in part by a configuration of a second set of spacer dots within the second touch pad portion;
wherein the first sensitivity and the second sensitivity differ due to differences in the configuration of the first set of spacer dots and the configuration of the second set of spacer dots, wherein a spacer dot diameter in the first and second touch pad portions is the same and wherein a spacer dot pitch in the first and second touch pad portions differs.

11. A touch pad for a data processing system, comprising:
a first touch pad portion having a first sensitivity determined at least in part by a configuration of a first set of spacer dots within the first touch pad portion; and
a second touch pad portion having a second sensitivity determined at least in part by a configuration of a second set of spacer dots within the second touch pad portion;
wherein the first sensitivity and the second sensitivity differ due to differences in the configuration of the first set of spacer dots and the configuration of the second set of spacer dots, wherein a spacer dot diameter in the first and second touch pad portion differs and wherein a spacer dot pitch in the first and second touch pad portions is the same.

12. A touch pad for a data processing system, comprising:
a first touch pad portion having a first sensitivity determined at least in part by a configuration of a first set of spacer dots within the first touch pad portion; and
a second touch pad portion having a second sensitivity determined at least in part by a configuration of a second set of spacer dots within the second touch pad portion;
wherein the first sensitivity and the second sensitivity differ due to differences in the configuration of the first set of spacer dots and the configuration of the second set of spacer dots, wherein a spacer dot diameter in the first and second touch pad portions differs and wherein a spacer dot pitch in the first and second touch pad portions differs.

13. A touch pad for a data processing system, comprising:
a touch pad film over a first electrically conductive thin film;
a second electrically conductive thin film over a touch pad substrate;
first physical means for preventing a force below a first threshold applied to a first portion of the touch pad film from creating electrical contact between the first electrically conductive thin film and the second electrically conductive thin film, and second physical means for preventing a force below a second threshold applied to a second portion of the touch pad film from creating electrical contact between the first electrically conductive thin film and the second electrically conductive thin film, wherein the first and second thresholds differ due to differences in the first and second physical means, wherein the first and second physical means comprise electrically insulating spacer dots formed on the second electrically conductive thin film, and wherein a ratio of spacer dot diameter to spacer dot pitch in the first portion of the touch pad film differs from a ratio of spacer dot diameter to spacer dot pitch in the second portion of the touch pad film.

14. The touch pad of claim 13, wherein the ratio in the first portion is in a range of approximately 0.01 to 0.05 and the ratio in the second portion is in a range of approximately 0.8 to 0.14.

* * * * *